United States Patent [19]
Poindexter

[11] 3,858,089

[45] Dec. 31, 1974

[54] ELECTRICAL PROTECTIVE DEVICE USING A REED RELAY

[75] Inventor: Carleton H. Poindexter, Bensenville, Ill.

[73] Assignee: GTE Automatic Electric Laboratories Incorporated, Northlake, Ill.

[22] Filed: Oct. 23, 1973

[21] Appl. No.: 408,348

[52] U.S. Cl. .................... 317/16, 317/61, 317/76
[51] Int. Cl. ............................................. H02h 3/10
[58] Field of Search .......... 317/61.5, 62, 76, 61, 16; 179/78 A

[56] References Cited
UNITED STATES PATENTS
| | | | |
|---|---|---|---|
| 1,382,795 | 6/1921 | McNeill | 317/76 |
| 1,971,146 | 8/1934 | Rovere et al. | 317/76 |
| 3,760,227 | 9/1973 | Poindexter | 317/62 |

*Primary Examiner*—Donovan F. Duggan
*Assistant Examiner*—Harry E. Moose, Jr.
*Attorney, Agent, or Firm*—Robert J. Black

[57] ABSTRACT

Apparatus for protecting electrical equipment, such as standard telephone equipment, against transient voltages and/or currents as are frequently caused by, for example, lightning disturbances and power crosses. The protective device comprises a modified reed relay which is inserted in the line leading to the equipment desired to be protected. The coil of the reed relay is connected in series in the line, while the contact blades thereof provide a shunt connection to ground. The gaseous mixture and pressure within the relay capsule is chosen to provide an ionization current path between the blades at a predetermined breakdown voltage level corresponding to that encounterable from a lightning disturbance, whereby any high voltage transient on the line will be directed to ground via the contact blades of the reed relay and the activated gas therebetween. Longer duration disturbances, such as are caused by a power cross, will be fed through the coil to set up a magnetic field to short circuit the contact blades of the reed relay, once again directing the disturbance to ground.

7 Claims, 1 Drawing Figure

PATENTED DEC 31 1974  3,858,089
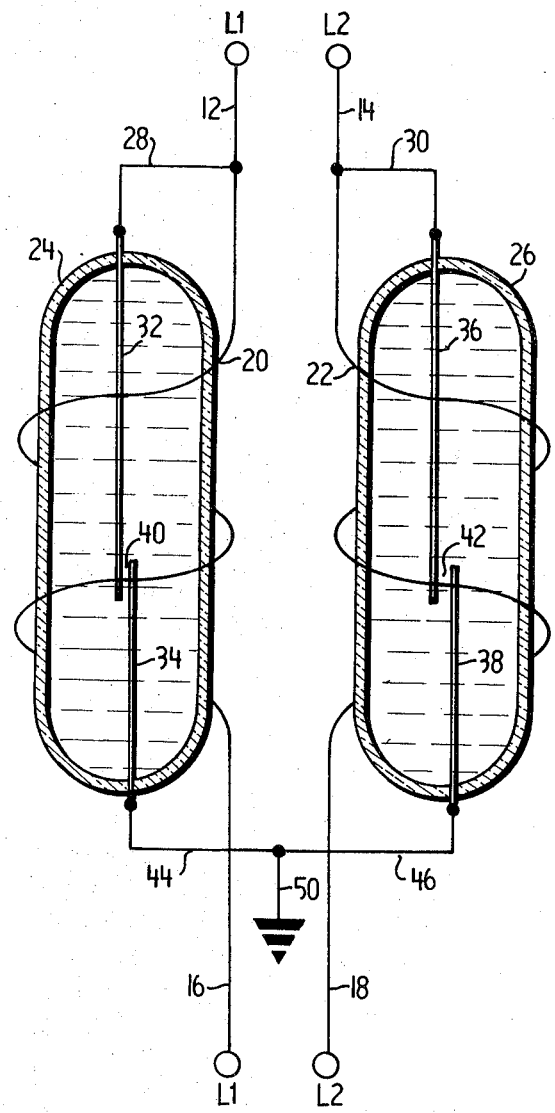

ELECTRICAL PROTECTIVE DEVICE USING A REED RELAY

BACKGROUND OF THE INVENTION

1. Field of the Invention

This invention relates to electrical protective devices and, more particularly, to apparatus for protecting telephone equipment against transient voltages and/or currents as can be created by either lightning disturbances or power crosses.

2. Description of the Prior Art

Many devices have been developed and are well known in the art for providing protection to electrical equipment from transient overvoltages that may be due to, for example, lighting disturbances. Telephone systems, for example, utilize a protective device to prevent excess voltage inadvertently appearing on the telephone line from reaching the telephone receiver, thereby preventing injury to both person and equipment. In addition to the high voltage, short duration lightning disturbances, telephone equipment must also be protected against longer duration, relatively high current, low voltage disturbances due to, for example, a power cross which occurs when commercial power lines come in contact with telephone lines, a not infrequent occurrence during severe weather conditions.

Accordingly, two types of protective devices must generally be inserted into telephone lines to protect the equipment against the two distinctly different types of disturbances. Examples of prior art overvoltage protection devices, e.g., lightning arrestors, appear in U.S. Pats. to McNeill (No. 1,382,795), Rovere et al. (No. 1,971,146), Fayling (No. 3,492,532), and Peche (No. 3,710,191). Typical of the prior art lightning arrestors are those which establish a spark gap through air or a gaseous medium between two electrodes, the breakdown voltage of the gap being preselected to be equal to that voltage likely to be encountered from a low voltage lightning stroke. Such overvoltage protection devices of the prior art suffer from many deficiencies, amongst them including a lack of ruggedness, high cost of manufacture, low reliability, and operational reliance on gravitational forces, which naturally imposes severe practical limitations. Additionally, most of the prior art overvoltage protection devices do not include means for adequately protecting against damaging currents which may be present in conjunction with voltages that do not exceed the breakdown voltage of the device. These low voltage, high current disturbances must be dealt with by other means, such as series connected fuses or the like. This introduces an additional undesireable material cost factor, not to mention the additional cost in man-hours required to replace such a fuse when it has blown.

It is therefore evident that a need exists for a single device which can efficiently perform both types of circuit protection; namely, protecting against high voltage transients due to lightning disturbances and against relatively high current but lower voltage abnormalities which may last appreciably longer than a lightning disturbance and may be, for example, that kind of disturbance encountered in a power cross.

SUMMARY OF THE INVENTION

Accordingly, it is a primary object of the present invention to provide a device for protecting electrical equipment from both high voltage transients and longer duration current abnormalities.

Another object of the present invention is to provide an electrical protective device which combines in a single, simple, compact, and low cost unit the capabilities of preventing both a transient overvoltage and a longer duration, relatively low voltage current abnormality from reaching a load.

A further object of the present invention is to provide a device for protecting telephone equipment from electrical lightning disturbances and/or power crosses appearing on the telephone lines thereto.

A still further object of the present invention is to provide a device for protecting electrical equipment from excessive voltages and/or currents which is economical, compact, easy to manufacture using known techniques, and is capable of repeated use after being subjected to either an overvoltage or overcurrent condition.

The foregoing and other objects are obtained in accordance with one aspect of the present invention through the provision of a device for protecting electrical equipment from an abnormal voltage or current appearing on an input line thereto, which generally comprises what is known in the art as a reed relay or switch which, after modification, is inserted in the line leading to the equipment desired to be protected. The reed relay comprises a pair of electrically conductive contact blades attached to the opposite ends of an evacuated relay capsule so as to form a gap between the contact points thereof. A coil is wrapped around the capsule and, when energized, creates a magnetic field to cause the contact blades to short-circuit, thereby closing the relay.

A standard reed relay is modified according to the present invention by selecting the gas mixture, pressure, and electrode spacing so as to be responsive to a breakdown voltage of the level desired. The blades of the reed relay form a shunt connection from the equipment line to ground, while the coil of the relay is connected serially in the line leading to the equipment. Upon the occurrence of an overvoltage, a discharge will be produced in the relay capsule to direct the disturbance to ground via an ionization path formed between the blades of the relay. On the other hand, if a longer duration, relatively lower voltage current disturbance occurs, such as due to a power cross, the coil will act to establish a magnetic field to close the blades of the reed relay in the normal fashion to again direct the disturbance to ground.

BRIEF DESCRIPTION OF THE DRAWING

Various objects, features and attendant advantages of the present invention will be more fully appreciated as the same becomes better understood from the following detailed description of the present invention when considered in connection with the accompanying drawing, in which the sole FIGURE thereof is illustrative of a preferred embodiment of the electrical protection device according to the present invention in combination with a telephone line.

DETAILED DESCRIPTION OF A PREFERRED EMBODIMENT

Referring now to the sole FIGURE of the drawing, there is depicted a pair of the devices of the present invention in cooperation with a pair of telephone lines L1 and L2. Although the device of the present invention will be described hereinafter with respect to a pair of telephone lines, it will be understood by those skilled in the art that the present invention is easily adaptable to other telecommunications lines for protecting a multitude of various different equipments. Lines L1 and L2 have input leads 12 and 14, respectively, and output leads 16 and 18 which lead to a telephone receiver, for example. Connected in series between input leads 12 and 14 and output leads 16 and 18 are magnetic field producing means 20 and 22, respectively, each in the form of a multi-turn coil.

Coil 20, connected in series along line L1, is shown in the FIGURE as having a substantially cylindrical configuration and as being wrapped around a substantially cylindrical sealed chamber or capsule 24. Capsule 24, which may be comprised of a relatively rigid magnetically impermeable light transmitting material such as glass, has a pair of contact blades 32 and 34 affixed to either end thereof. Contact blades 32 and 34 are comprised of a magnetizable electrical conductor, such as steel, and may have a gold or indium coating at the portions thereof in juxtaposition to gap 40 formed therebetween to reduce the contact resistance thereat, as is well known. Tube 24 is filled with an ionizable gas or gaseous mixture, which may comprise, for example, a mixture of hydrogen, argon and small traces of krypton 85. The pressure of the gas or gas mixture and the shape and spacing of blades 32 and 34 are selected to produce a gas discharge in gap 40 therebetween whenever a certain breakdown voltage occurs. The contact blades 32 and 34, which sealingly project through the opposite ends of tube 24, are connected to conductors 28 and 44, respectively. Conductor 28 electrically connects blade 32 with the input portion 12 of line L1 while conductor 44 electrically connects blade 34 to ground 50.

The aforedescribed construction of the device of the present invention in connection with telephone line L1 is understood to be the same as that of the device depicted in combination with telephone line L2, which comprises a capsule 26, the contact blades 36 and 38 having a gap 42 formed between the free ends thereof, the external leads 30 and 46 connected to blades 36 and 38 respectively, and coil 22 wrapped around capsule 26 which has an ionizable gas or gaseous mixture sealingly contained therein.

Telephone lines L1 and L2 in normal operation handle voltages of approximately 50 V. and currents up to 70 or 80 Ma. High voltage pulses from 300 to several thousand volts are normally created by lightning disturbances. If such a high voltage pulse strikes line L1, for example, the pulse will be impressed along electrode 28 to contact blade 32. The gas mixture within tube 24 will be rapidly ionized to form an ionization current path between blade 32 and blade 34 at gap 40. This completes a circuit path for line L1 to ground which can be traced along input lead 12, electrode 28, blade 32, gap 40, blade 34, electrode 44 and ground 50. Thus, it is seen that such high voltage lightning disturbances will be fed to ground to thereby protect any equipment attached to output lead 16 of line L1. As a result of the lightning disturbance, some current may flow through coil 20 from input lead 12; however, since the disturbance is of such a short duration (2-10 microseconds) coil 20 cannot build up sufficient magnetic flux to mechanically activate blades 32 and 34. However, additional protection is provided since the rapid pulse rise rate creates, in effect, a high impedance choke coil 20.

In the case of a power cross, which occurs, for example, when commerical power lines of 110, 220 or 440 volts come into contact with telephone lines L1 and/or L2, currents of about 200-300 amperes may be impressed on the equipment which can be severely damaging. With the device of the present invention, such high current can also be suppressed even if the associated voltage does not exceed the breakdown voltage of the gas or gaseous mixture within capsules 24 or 26. In the case of such a power cross on line L1, which can last for a few seconds or for several hours, the current will be fed along lead 12 through coil 20 or for several hours, the current will be fed along lead 12 through coil 20 for a short period until sufficient magnetic flux has built up to activate contact blades 32 and 34. Upon activation, blades 32 and 34 contact one another at the central portion thereof to once again shunt the input lead 12 of line L1 to ground 50 via electrode 28, blades 32 and 34, and electrode 44. It is important to note that the foregoing occurs regardless of the associated voltage of the abnormal current surge along line L1 and, accordingly, the device of the present invention is well suited to both detect abnormal surges of current and/or voltage. The size of the wire and the number of turns chosen for coil 20 determine the magnitude of current necessary to activate contact blades 32 and 34. If desired, the coil may be designed such that relatively low power cross currents will activate blades 32 and 34, while relatively high power cross currents will fuse open coil 20, thereby providing additional protection.

It is seen that capsule 24, contact blades 32 and 34 and coil 20 basically comprise what is known in the art as a reed relay or switch, wherein a short circuit is effectuated between the external connections to the blades upon the application of a certain magnitude of current to the coil surrounding the capsule. Such reed relays are well known in the art but have found no previous application as an electrical protection device as contemplated by the present invention. The gas mixture in standard reed relays needs to be modified as to pressure and content to provide the breakdown voltage levels necessary for utilization in the context of an overvoltage protection device. For example, the hydrogen, argon and krypton 85 gas mixture described hereinabove is more conducive than standard reed switch gas mixtures for carrying and dissipating the current that would result, for example, from a lightning bolt. Krypton 85 is a radioactive tracer element which, as is well known, speeds up and stabilizes the response of the capsule. The device of the present invention is completely self-restoring, in that upon the removal of the disturbing voltage and/or current, the gas will deionize or the contact blades will separate to reopen the shunt path to ground thereby reestablishing the main line connection.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A device for protecting electrical equipment from an abnormal voltage or current appearing on an input line thereto, which comprises: means for enclosing a pair of electrically conductive blades positioned in a predetermined spatial relationship, wherein said enclosing means comprises a sealed chamber consisting of an elongated capsule of substantially cylindrical shape; a first external lead connected between one of said blades and said input line; a second external lead connected between the other of said blades and ground; each of said blades being affixed to an opposite end of said elongated capsule and each extending longitudinally past the center of said capsule, to form an overlapping juxtaposed configuration, said blades in their normal unactivated state overlapping and forming a gap between each other; means comprising an ionizable gas capable of sustaining an ionization current flow, contained within said enclosing means, for producing a discharge between said overlapping portion of said blades in response to said abnormal voltage; means comprising a coil electrically connected in series between said first external lead and said electrical equipment, and surrounding said capsule so that the magnetic field from said coil encompasses said capsule, operated to produce a magnetic field in response to said abnormal current to cause said pair of blades at their center overlapping portions to contact one another.

2. The device for protecting electrical equipment according to claim 1 wherein said magnetic field producing means is electrically connected in series between said first external lead and said electrical equipment.

3. The device for protecting electrical equipment according to claim 2 wherein said magnetic field producing means comprises a coil positioned around said enclosing means.

4. The device for protecting electrical equipment according to claim 1 wherein said sealed chamber comprises an elongated substantially cylindrical capsule constructed of a glass.

5. The device for protecting electrical equipment according to claim 1 wherein said ionizable gaseous means comprises a mixture of hydrogen, argon and krypton 85.

6. The device for protecting electrical equipment according to claim 1 wherein said electrical equipment comprises a telephone and wherein said abnormal voltage is in the range of 300 to 500 volts.

7. The device for protecting electrical equipment according to claim 1 wherein said enclosing means and said magnetic field producing means comprise a reed relay.

* * * * *